United States Patent [19]

Reinke

[11] Patent Number: 5,445,343

[45] Date of Patent: Aug. 29, 1995

[54] FILM SPOOL WITH INTEGRAL CANTILEVER TO ENGAGE AND RELEASE FILM END

[75] Inventor: Stephen M. Reinke, Rochester, N.Y.

[73] Assignee: Eastman Kodak Company, Rochester, N.Y.

[21] Appl. No.: 182,255

[22] Filed: Jan. 14, 1994

[51] Int. Cl.⁶ .................................. B65H 75/28
[52] U.S. Cl. ................................... 242/587.1
[58] Field of Search ............... 242/587.1, 587.2, 587.3

[56] References Cited

U.S. PATENT DOCUMENTS

| | | | |
|---|---|---|---|
| 4,334,750 | 6/1982 | Fichter | 354/275 |
| 4,834,310 | 5/1989 | Ikariya et al. | |
| 4,984,751 | 1/1991 | Hoffacker et al. | |
| 5,054,710 | 10/1991 | Ikariya et al. | 242/587.1 |

Primary Examiner—Daniel P. Stodola
Assistant Examiner—Emmanuel M. Marcelo
Attorney, Agent, or Firm—Roger A. Fields

[57] ABSTRACT

A film spool comprises a spool core having a slot for receiving a film end, a cantilevered beam supported at only one end inside the slot to prevent movement of the beam along the slot and to allow the beam to be swung laterally within the slot, a film engagement protrusion projecting into the slot from either one of the spool core or the cantilevered beam to engage a film end within the slot, and a film stripper protrusion projecting into the slot from whichever one of the spool core or the cantilevered beam the film engagement protrusion does not project from to disengage a film end from the film engagement protrusion when the beam is swung laterally within the slot.

6 Claims, 3 Drawing Sheets

FILM SPOOL WITH INTEGRAL CANTILEVER TO ENGAGE AND RELEASE FILM END

CROSS-REFERENCE TO RELATED APPLICATIONS

Reference is made to commonly assigned copending applications Ser. No. 08/181,322, entitled FILM SPOOL WITH INTERNAL FLEXURES TO ENGAGE AND RELEASE FILM END and filed Jan. 14, 1994 in the name of Stephen M. Reinke, and Ser. No. 08/181,935, entitled FILM SPOOL WITH AXIALLY FLEXIBLE CORE TO ENGAGE AND RELEASE FILM END and filed Jan. 14, 1994 in the name of Stephen M. Reinke, each of which are assigned to the assignee of this application.

FIELD OF THE INVENTION

The invention relates generally to the field of photography, and in particular to film spools. More specifically, the invention relates to a film spool with a core or hub which has an integral cantilever that can be pivoted at one end in opposite directions to engage and release one end of a filmstrip intended to be wound in a film roll onto the spool.

BACKGROUND OF THE INVENTION

The typical film spool, such as a supply spool in a film cartridge or a take-up spool in a camera, is known to include some means for releaseably attaching a film end to the spool.

For example, prior art U.S. Pat. No. 4,334,750, issued Jun. 15, 1982, discloses a film spool comprising an off-axis peripheral slot in the spool core which is dimensioned to receive a reduced-width film end, and a film engagement protrusion that projects through an internal opening into the slot to engage the film end. The engagement protrusion is located on one of two legs of a u-shaped resilient member which is slidable inwardly along a central hollow in the spool core until the engagement protrusion pops through the internal opening from the central hollow into the slot to engage the film end. To release the film end, the engagement protrusion is retracted through the internal opening from the slot into the central hollow as a result of sliding the u-shaped resilient member further along the central hollow against a fixed camming incline in the hollow.

PROBLEMS TO BE SOLVED BY THE INVENTION

In prior art U.S. Pat. No. 4,334,750, a film end might be unintentionally slipped off the film engagement protrusion. Also, the film engagement protrusion must be retracted from the slot to release the film end, and the u-shaped resilient member can be slid far enough into the central hollow of the spool core when the film engagement protrusion is retracted from the slot that the resilient member may become impossible to grasp in order to reuse the film engagement protrusion.

SUMMARY OF THE INVENTION

According to the invention, there is provided a film spool comprising:

a spool core having a slot for receiving a film end;

a cantilevered beam supported at only one end inside the slot to prevent movement of the beam along the slot and to allow the beam to be swung laterally within the slot;

a film engagement protrusion projecting into the slot from either one of the spool core or the cantilevered beam to engage a film end within the slot; and a film stripper protrusion projecting into the slot from whichever one of the spool core or the cantilevered beam the film engagement protrusion does not project from to disengage a film end from the film engagement protrusion when the beam is swung laterally within the slot.

ADVANTAGEOUS EFFECTS OF THE INVENTION

The invention eliminates the problems that may occur with the film spool disclosed in prior art U.S. Pat. No. 4,334,750

DETAILED DESCRIPTION OF THE INVENTION

The invention is disclosed as being embodied preferably in a film spool. Because the features of a film spool are generally known, the description which follows is directed in particular only to those elements forming part of or cooperating directly with the disclosed embodiment. It is to be understood, however, that other elements may take various forms known to a person of ordinary skill in the art.

Figure 1:
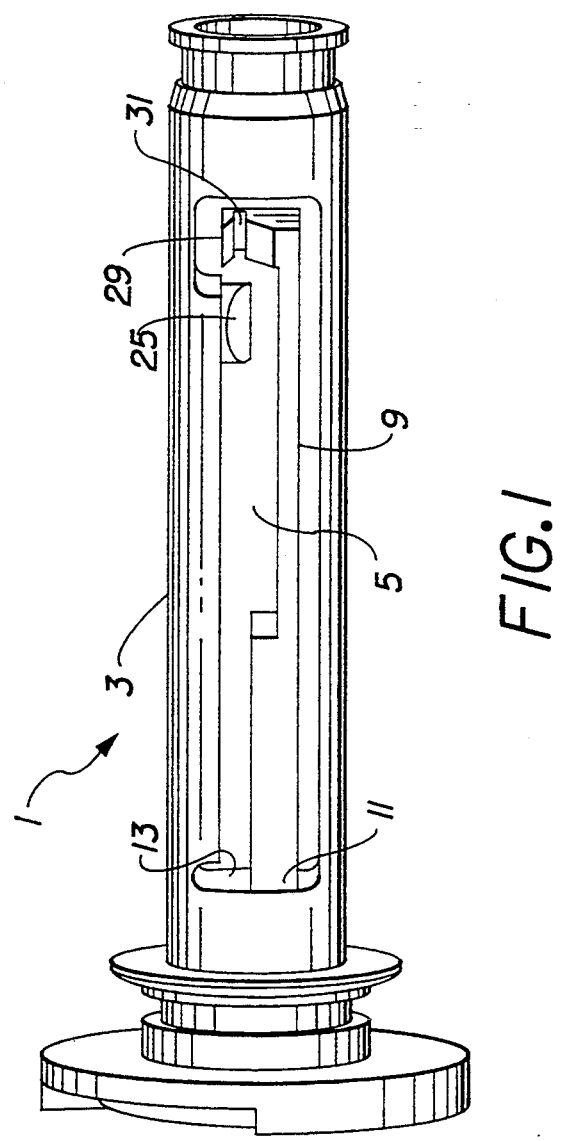
FIG. 1 is a perspective view of a film spool according to a preferred embodiment of the invention.
Figure 2:
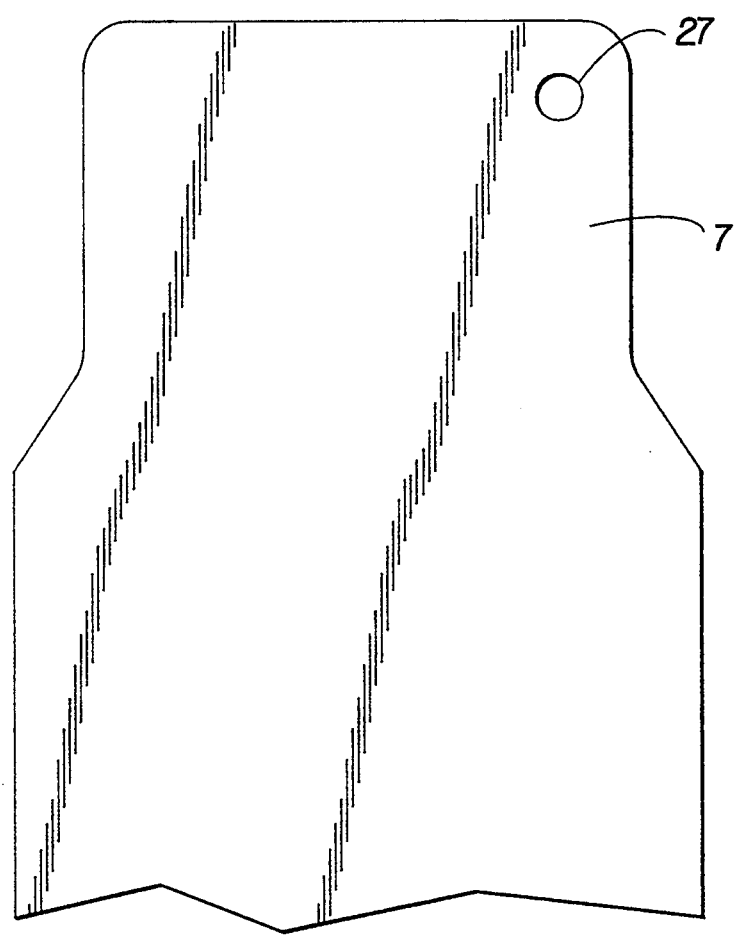
FIG. 2 is a plan view of a film end to be used with the film spool.
Figure 3:
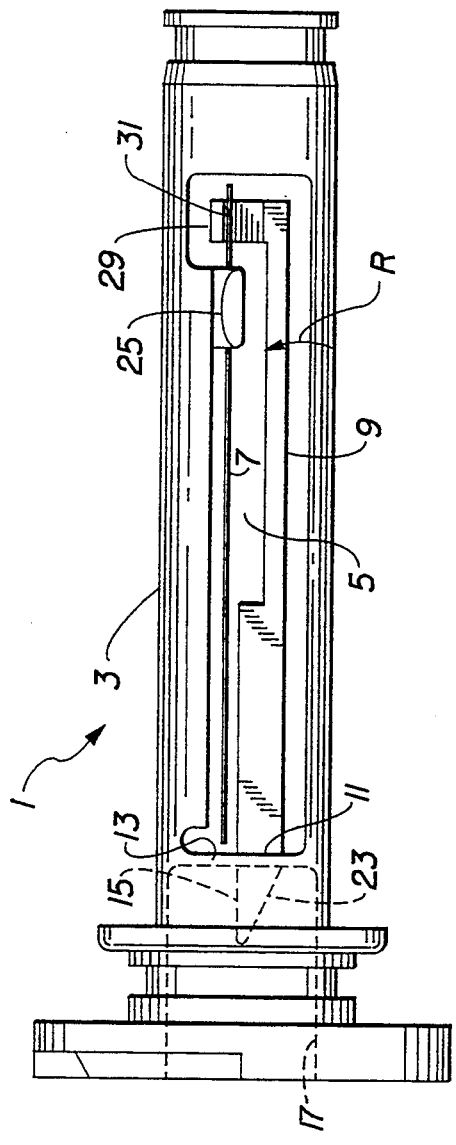
FIGS. 3 and 4 are plan views of the film spool depicting how the film end is secured to the spool.
Figure 4:
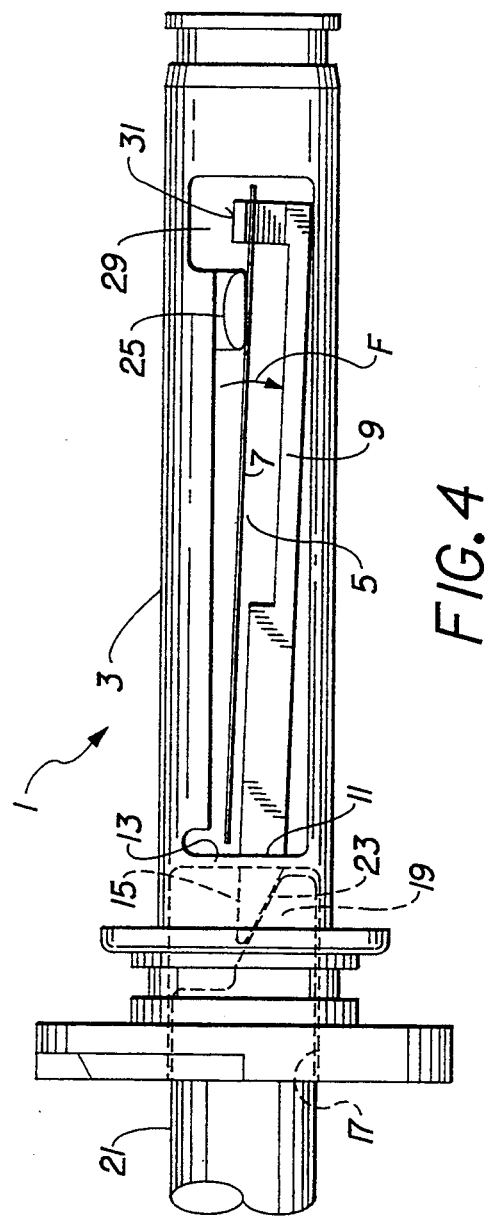

Referring now to the drawings, FIGS. 1–4 show a film spool 1 with a spool core 3 having a slot 5 for receiving a film end 7. A rigid or resilient cantilevered beam 9 is supported at one end 11 of the beam via a thin resilient portion 13 of the spool core 3. The resilient portion 13 prevents translation of the beam 9 along the slot 3, but is flexible to allow the beam to be swung laterally within the slot in a forward direction F, i.e. clockwise as viewed in FIG. 4, and is biased to return the beam in a reverse direction, i.e. counterclockwise as viewed in FIG. 3. An actuator extension 15 of the beam 9 is located outside the slot 5 in a centered end cavity 17 of the spool core 3. The actuator extension 15 can be manipulated to swing the beam 9 in the forward direction F, as shown in FIG. 4, by pushing a wedge-like end 19 of a camming tool 21 against an inclined cam follower surface 23 of the actuator extension. When the wedge-like end 19 is removed from the cavity 17, the resilient portion 13 of the spool core 3 returns the beam 9 in the reverse direction R as shown in FIG. 3. In place of the actuator extension 15, the resilient portion 13 of the spool core can have a central hole that is open to the end cavity 17 and to a centered cavity in the end 11 of the spool core 3 to insert the camming tool 21 through the hole into the cavity A film engagement protrusion 25 projects into the slot 5 from the spool core 3 to be received in a hole 27 in the film end 7 to engage the film end to secure the film end to the spool core. See FIG. 3. A film stripper/anti-slippage protrusion 29 projects into the slot 5 from the beam 9. The protrusion 29 includes a film supporting notch 31 normally located substantially in alignment with the protrusion 25. As can be seen in FIGS. 3 and 4, to secure the film end 7 to the spool core 3, first the wedge-like end 19 of the camming tool 21 is pushed against the inclined cam follower surface 23 of the actuator extension 15 to manipulate the actuator extension to swing the beam 9 in the forward direction F and move the notch 31 out of alignment with protrusion 25. Then the film end 7 is inserted into the slot 5 and into the notch 31. Finally, the wedge-like end 19 is removed from the cavity 17, permitting the resilient portion 13 of the spool core 3 to return the beam 9 in the reverse direction R to return the notch 31 substantially into alignment with the protrusion 25 to cause the protrusion to be received in the hole 27 in the film end 7.

As shown in FIG. 3, the notch 31 operates to hold the film end 7 in engagement with the protrusion 25 to prevent the film end from slipping off the protrusion as long as the notch 31 is located substantially in alignment with the protrusion 25. However, as shown in FIG. 4, when the wedge-like end 19 of the camming tool 21 is pushed against the inclined cam follower surface 23 of the actuator extension 15 to manipulate the actuator extension to swing the beam 9 in the forward direction F, the notch 31 operates to remove the film end 7 from the protrusion 25.

The invention has been described with reference to a preferred embodiment. However, it will be appreciated that variations and modifications can be effected by a person of ordinary skill in the art without departing from the scope of the invention.

PARTS LIST FOR FIGS. 1-4

1. film spool
3. spool core
5. slot
7. film end
9. cantilevered beam
11. one end of beam
13. resilient portion of spool core
15. actuator extension of beam
17. end cavity of spool core
19. wedge-like end of camming tool
21. camming tool
23. cam follower surface of actuator extension
25. film engagement protrusion
27. film hole
29. film stripper/anti-slippage protrusion
31. notch
F. forward direction
R. reverse direction

What is claimed is:

1. A film spool comprising:
   a spool core having a slot for receiving a film end;
   a cantilevered beam fixed at one end to said spool core, inside said slot, to prevent movement of said beam along the slot and flexibly supported to allow the beam to be swung laterally within the slot;
   a film engagement protrusion projecting into said slot from one of said spool core and said cantilevered beam to engage a film end within the slot to secure the film end to the spool core; and
   a film stripper protrusion projecting into said slot from the other one of said spool core and said cantilevered beam to hold a film end to remove it from the film engagement protrusion when the beam is swung laterally within the slot.

2. A film spool as recited in claim 1, wherein said film engagement protrusion projects from said spool core to be fixed within said slot, said cantilevered beam is supported to be swung toward and away from said film engagement protrusion, and said film stripper protrusion projects from said cantilevered beam to disengage a film end from said film engagement protrusion when the beam is swung away from the film engagement protrusion.

3. A film spool as recited in claim 2, wherein said film stripper protrusion includes film supporting means for supporting a film end to position the film end in engagement with said film engagement protrusion when the beam is swung toward the film engagement protrusion.

4. A film spool as recited in claim 1, wherein said cantilevered beam includes an actuator extension located outside said slot beyond said one end of the beam which can be manipulated to swing the beam laterally within the slot.

5. A film spool comprising:
   a spool core having a slot for receiving a film end;
   a projecting beam located inside said slot;
   resilient support means connecting said spool core and said projecting beam substantially adjacent one end of said slot to prevent movement of said beam along said slot, but being flexible to allow the beam to be swung laterally within the slot in a forward direction and being biased, to return the beam in a reverse direction;
   film engagement means jutting from said spool core to protrude into said slot for engaging a film end within the slot; and
   film positioning and stripping means jutting out from said projecting beam to protrude into said slot for positioning a film end in engagement with said film engagement means when the beam is returned in the reverse direction and for removing the film end from the film engagement means when the beam is swung in the forward direction.

6. A film spool as recited in claim 5, wherein said projecting means includes actuator means located to be accessed from outside said slot for engagement to swing the beam laterally within the slot in the forward direction and for disengagement to allow the beam to be returned in the reverse direction.

* * * * *